United States Patent [19]

Eglise et al.

[11] Patent Number: 4,937,436

[45] Date of Patent: Jun. 26, 1990

[54] MAGNETICALLY ENCODED CARDS

[75] Inventors: David Eglise, Berkshire; Douglas A. Jenkins, Hampshire, both of England

[73] Assignee: Mars Incorporated, McLean, Va.

[21] Appl. No.: 309,003

[22] Filed: Feb. 7, 1989

Related U.S. Application Data

[63] Continuation of Ser. No. 23,118, Mar. 27, 1987, abandoned.

[30] Foreign Application Priority Data

Jul. 1, 1985 [GB] United Kingdom ............... 8516625

[51] Int. Cl.$^5$ ............................................. G06K 5/00
[52] U.S. Cl. ................................... 235/380; 235/449; 235/494
[58] Field of Search ............ 235/375, 380, 382, 382.5, 235/449, 493, 494

[56] References Cited

U.S. PATENT DOCUMENTS

| | | | |
|---|---|---|---|
| 3,683,413 | 8/1972 | Schlaepfer | 235/280 |
| 4,013,894 | 3/1977 | Foote et al. | 235/380 |
| 4,024,379 | 5/1977 | Pfost et al. | 235/380 |
| 4,081,132 | 3/1978 | Pearce | 235/493 |
| 4,090,662 | 5/1978 | Fayling | 235/493 |
| 4,195,771 | 4/1980 | Lagarde | 235/380 |
| 4,370,550 | 1/1983 | Sidline | 235/375 |

*Primary Examiner*—Roy N. Envall, Jr.
*Attorney, Agent, or Firm*—Davis Hoxie Faithfull & Hapgood

[57] ABSTRACT

A magnetically encoded card (2) has a recording track (6, 8) containing data (10, 14, 16, 18) which can be read and re-written by a card reader (30), and a further recording (12) at a much higher spatial bit denisty than the data (10, 14, 16, 18). The high denisty recording (12) is formed using a special write head capable of operating at greater bit densities than the head of the card reader used to write information to the card. The card (2) is deemed valid only if the presence of the high density recording (12) is detected by a read head (34) of the card reader.

24 Claims, 1 Drawing Sheet

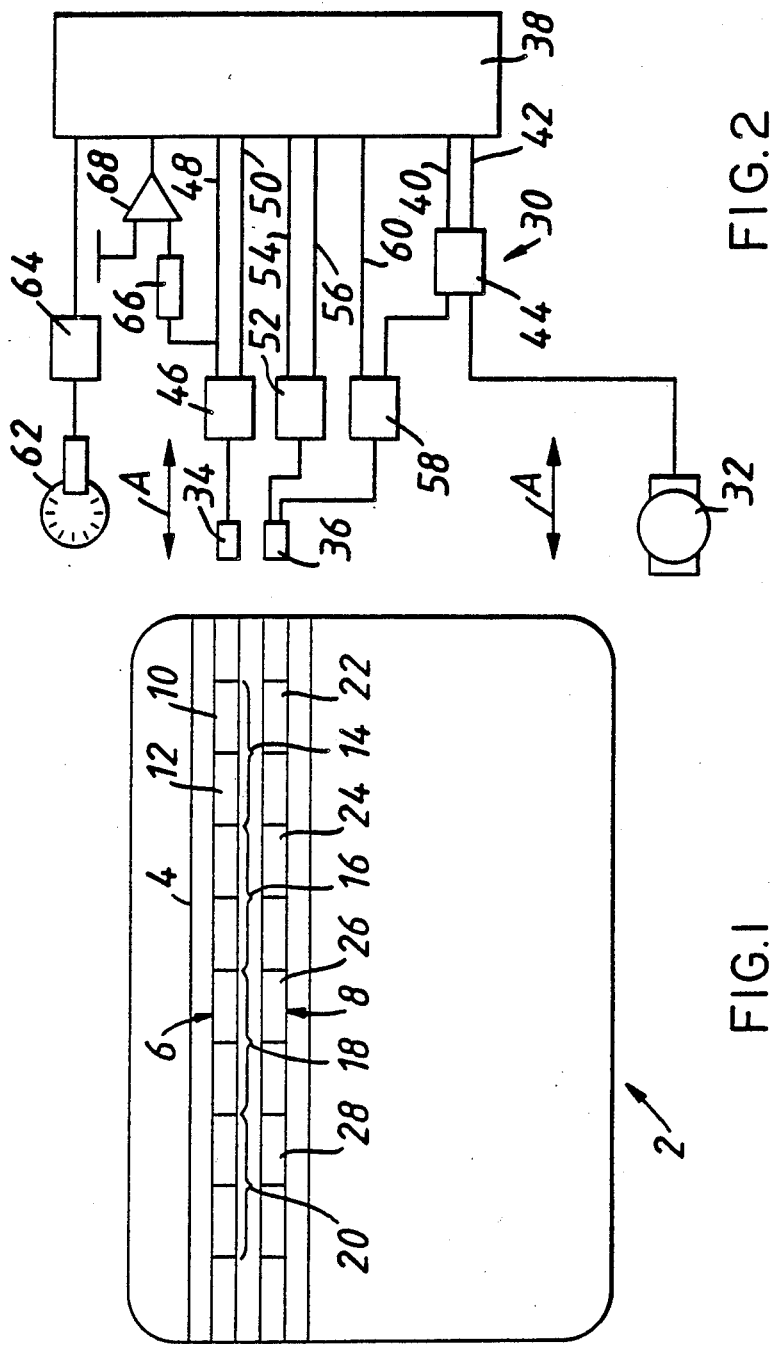

MAGNETICALLY ENCODED CARDS

This is a continuation of co-pending application Ser. No. 07/023,118 filed on Mar. 27, 1987, abandoned.

This invention relates to magnetically encoded cards, to card readers for use with such cards, and to techniques for encoding such cards.

Some magnetically encoded cards, such as those used in on-line cash dispensing systems, carry only nonalterable identification information. In other systems, however, it is necessary for some of the data on the card to be alterable. This is desirable in off-line cash dispensing systems, and in numerous other areas. For such purposes, it is conventional to use cards in which the magnetic recording medium is of low coercivity (not greater than 300 oersteds), so that the card reader can readily erase the information on the card and write onto the card new information.

Such systems are very prone to fraud, because it is very simple to obtain equipment which is capable of reading data from a card and writing that same data onto a blank card.

There have been a number of proposals to deal with this problem. One reasonably effective technique which is currently in use involves cards which carry a double layer of recording medium, one layer of which is of low coercivity material and the second layer of which is disposed on top of the first layer and is formed of high coercivity material (greater than 600 oersteds and preferably around 4000 oersteds). Data is recorded onto one track of the dual layer recording medium using a special write head capable of generating very strong magnetic fields. This causes the data to be substantially permanently recorded by the high coercivity layer. A second track of the recording medium stores alterable data which is recorded in the low coercivity layer using magnetic fields of ordinary strength.

When the card is read, an attempt is made to erase the data in the first track. This should not normally be possible because of the use of the high coercivity layer, and consequently the first track is subsequently read and if data is still present the card is deemed valid (subject to other security checks such as the presence of appropriate security codes, parity codes, etc.).

Such a system substantially reduces the possibility of fraud because of the use of the high coercivity layer which cannot be written-to using standard, readily-available equipment. At the same time, use of the low coercivity layer means that no special techniques are needed in the card reader for reading and writing the alterable data. The main problem with this system, however, is that the dual layer recording medium is very expensive, and consequently the cost of the cards is high.

It would therefore be desirable to produce a technique effective to prevent or substantially reduce fraud, without resulting in costly cards. One system recently proposed for providing incentives to customers involves the distribution of free magnetically encodeable cards for the customers to insert in card readers each time a purchase is made so that a value encoded on the card can be incremented. When the encoded value is sufficiently great, the card can be exchanged for a gift. Inexpensive cards which are not readily subject to fraud would be very valuable particularly (although not exclusively) for such a system.

The present invention is directed to a magnetically encoded card which carries both recorded data and a recording of much higher spatial density than the data. When the card is read by a card reader, the presence of the high density recording is sensed in order to determine whether or not the card is valid.

One advantage of this arrangement (which advantage also applies to the dual layer recording medium arrangement described above) is that a valid card cannot be produced or copied using standard, readily-available equipment which employs the same technology as that used in the card readers. In the case of the present invention, however, this is because the write heads used in the card readers cannot operate properly at the necessary frequencies to create the high density recording. An additional advantage, which does not apply to the dual layer recording medium arrangement, is that the card need only use a low coercivity recording layer. Further, very little modification of standard card readers is needed to make them suitable for use with a card according to the present invention. The present invention also has the advantage over the dual layer recording medium arrangement that the step of attempting to erase the unalterable data is no longer required, and indeed the write head and associated circuitry used for this purpose is no longer needed.

BRIEF DESCRIPTION OF THE DRAWINGS

FIG. 1 is a top view of a magnetically encoded card for use in the present invention; and FIG. 2 is a schematic diagram of a card reader capable of reading the tracks on a magnetically encoded card according to the present invention.

An arrangement according to the invention will now be described by way of example with reference to the accompanying drawings.

Referring to FIG. 1, the card 2 is constructed using standard techniques for forming magnetically encoded cards, and carries a strip 4 of magnetic material of low coercivity (around 300 oersteds). The strip 4 defines a magnetically encodeable area within which are located two tracks 6 and 8 extending along the card. The physical dimensions of the card, and the dimensions and locations of the strip 4 and tracks 6 and 8 are preferably in accordance with International Standard ISO 3554.

The track 6 has been coded or recorded using a specially designed write head capable of producing a rapidly varying magnetic field of sufficient strength as to create a saturated recording in the low coercivity magnetic recording medium. The head can be designed using the same techniques as standard write heads, but with the parameters of the head, such as the coil size and the head gap width, selected in accordance with the desired characteristics. Clearly, the drive circuitry may be of a standard type, except for such modifications, e.g. alteration of the frequency and amplitude of the drive current, as are necessary to cope with the higher recording density. The card 2 is moved relative to the head during recording, and during this relative movement the head is driven at a first bit rate to record a first region 10 of data, using two frequency, coherent-phase recording as specified in ISO 3554, and then at a much higher rate to record a region 12 of high spatial density data. The data recorded in region 12 consists of a succession of "ones" (although "zeros" could instead be recorded, or indeed any desired sequence of bits if the region 12 is to contain information, which is not the case in the present embodiment). The consequence of this is that magnetic flux transitions are formed in a very high density within the region 12. The flux transitions may be evenly spaced in the direction of the card width, but this is not essential, as explained further below.

The regions 10 and 12 collectively form a data block 14. The same drive signals are again applied to the head three more times so as to record three further, identical data blocks 16, 18 and 20.

The second track 8 is written using a standard write head, which produces four successive blocks of identical data recorded in regions indicated at 22, 24, 26 and 28.

The repeated recording of data in successive blocks is carried out so that the card is not rendered useless if a particular region of the magnetic strip 4 is damaged or has data erased therefrom, as the data can be recovered from other regions of the strip 4.

Referring to FIG. 2, most of the card reader 30 is standard. The reader 30 includes a motor 32 arranged to reciprocate a read head 34 and a read/write head 36 past the card 2 in the direction of arrows A, with the heads aligned with tracks 6 and 8, respectively. (In some card readers it is conventional to have two read/write heads, rather than a read head and a read/write head, and to avoid substantial redesign or modification of standard card readers such an arrangement can also be used here, although the write function of head 34 is not needed.)

The card reader 30 has a control means 38, which may be a microprocessor, and which sends "forwards" and "backwards" signals along lines 40 and 42 to a motor drive unit 44 to cause the motor 32 to drive the heads in the respective directions (although instead the card could be reciprocated and the heads held stationary). Data read using the read head 34 is delivered to a decoder 46 which separates the received signal into data and synchronisation pulses which are delivered to the control means 38 along lines 48 and 50 respectively. Similarly, a decoder 52 converts signals from head 36 into data and synchronisation pulses delivered to the control means 38 along lines 54 and 56, respectively. The write function of the head 36 is used to erase data in track 8 and also to write new data onto the track, for which purpose the head 36 receives a drive signal from a logic and driver circuit 58, which in turn receives data from the control means 38 along line 60 and a synchronising signal from the motor drive unit 44.

A speed sensor 62 is driven by the movement of the heads and delivers signals via a buffer 64 to the control means 38 so as to synchronise the operation of the control means with the movement of the heads.

In addition to this standard arrangement, the card reader has a frequency to voltage converter 66, the input of which is connected to the data line 48 which carries data read by the read head 34. Alternatively, the input could be connected to the line 50 which carries synchronisation pulses separated from the data read by the read head 34. The output of the converter 66 is fed to one input of a comparator 68, the other input of which receives a reference voltage. The output of the comparator is delivered to the control means 38.

In operation, the heads 34 and 36 are driven past the card 2, to the left as shown in the accompanying drawing. As the region 12 in each of the data blocks 14, 16, 18 and 20 passes the read head 34, the head 34 will sense the high density of magnetic flux transitions, so that the signal delivered to the frequency to voltage converter 66 will be of a high frequency. Accordingly, the output of the converter 66 will exceed the reference voltage applied to the comparator 68, so that a signal of logic level "1" will be delivered to the control means 38. If the control means 38 senses a logic level of "1" in response to the passage of any one of the four regions 12 past the read head 34, it will determine the card as being of a valid type. (Instead, the reader 38 could be arranged so that the card is determined as valid only if at least two, or possibly three, of the regions 12 result in a logic level "1" being received.)

If the card is deemed valid, the heads are then moved in the opposite direction past the card, whereupon the data on the two tracks 6 and 8 is read by the heads and received by the control means 38.

The heads 34 and 36 are then moved again to the left as shown in the Figure, past the card 2, during the course of which the head 36 is driven so as to erase the data on the track 8. The heads are then moved to the right, and the head 36 is driven so as to write new data onto the track 8.

The above process can be modified as desired. For example, it would be possible to check for the presence of high density data in the regions 12 during the same pass as that in which the data on the tracks 6 and 8 is read, instead of in two separate passes.

The actual bit densities of the recordings on the magnetic strip 4 may be selected as desired. By way of example, the data recordings in regions 10 on track 6 may be recorded at the standard bit density set out in ISO 3554 of 3 bits per millimeter plus or minus 3 percent. The bit density on track 8 in one proposed embodiment is about 6 bits per millimeter, but it may alternatively correspond to the standard of 8.3 bits per millimeter plus or minus 5 percent, for example. In either case, it is preferred that the bit density used for recording data not be greater than the standard of 8.3 bits per millimeter plus 5 percent which is the highest standard value commonly found at present. With regard to the regions 12, the bit density used here is preferably not less than 40 bits per millimeter, which for a sequence of recorded "1's" corresponds to 80 flux transitions per millimeter, using the encoding technique set out in ISO 3554. Preferably, the recordings in the regions 12 have a density of not less than 400 flux transitions per millimeter. The reference voltage delivered to the comparator 68 will be set to correspond to a value slightly less than the density of flux transitions.

If desired, the density of the flux transitions in the regions 12 could be varied in accordance with a predetermined pattern. For example, the spatial density may be swept. The variation in the detected spatial density could then be checked, and the card deemed valid only if the detected density varies in the appropriate manner.

The arrangements mentioned above may be modified. The positions of the tracks 6 and 8 could be reversed. The frequency to voltage converter 66 and comparator 68 may be omitted, and the control means 38 arranged to count the pulses on line 48 or line 50 during the passage of the region 12 past the head 34 in order to determine whether the required high density recording is present. The high density recording regions 12 may be formed in a separate process from the formation of the data regions 10, if desired using different heads each operating at a constant bit density. The high density recording may be formed along the entire length of the track 6, and selected regions 10 may then be formed by erasing and then recording data in the appropriate areas. The data regions 10 could be omitted entirely if desired. All the data could be recorded in track 8, or alternatively the non-alterable data could be recorded within the high density recording regions 12.

High density recordings could also be formed along the track 8. In this case, it is desirable for the erasing of track 8 by the head 36 to be carried out only in those regions which contain data to be altered, so as to avoid erasing the high density recordings which cannot (in the preferred arrangement described above) be rewritten by the card reader 30. It will be appreciated from the above description that the preferred arrangement is one in which the card reader is incapable of creating the high density flux transitions which need to be sensed in order for the card to be deemed valid.

As described above, the relatively low density data is recorded in different regions from the relatively high density magnetic flux transitions. Although this is desired, by use of appropriate techniques for permitting superimposition of the different density recordings without erasing either, the low density data and high density flux transitions could be recorded within the same region.

The term "card" used herein is intended in a generic sense to cover any magnetic recording medium support, irrespective of the actual shape and size of the support.

We claim:

1. A card reader/writer for reading and writing magnetically encoded data from and onto a card, the card having magnetic recording media of predetermined coercivity for storing said data in the form of patterns of magnetic flux transitions which do not exceed a first predetermined spacial density, the reader/writer comprising head means (34, 36) capable of performing said reading and writing, and capable of sensing flux transitions of a second spatial density, substantially greater than said first spatial density, recorded on the card, said head means comprising standard write heads having a maximum data recording rate which does not substantially exceed the first predetermined spacial density, the reader/writer further comprising means (e.g., 66, 68) responsive at least to the sensing of flux transitions of said second spacial density recorded on the card for providing an indication of the validity of data read from the card.

2. A card reader/writer as claimed in claim 1, where the head means (34, 36) comprises a single head (34) arranged both to read data in the form of patterns of magnetic flux transitions which do not exceed said first predetermined spatial density and to sense flux transitions of said second spatial density.

3. A card reader/writer as claimed in claim 2, wherein the head means (34, 36) comprises an additional head (36) for reading and writing data in the form of patterns of magnetic flux transitions which do not exceed said first predetermined spatial density.

4. A card reader/writer as claimed in claim 3, wherein the heads (34, 36) are arranged to sense flux transitions in respective tracks of the card.

5. A card reader/writer as claimed in claim 1, wherein the validity indicating means is operable to count pulses from the head means (34, 36) in order to determine whether the spatial density of said magnetic flux transitions is less than said second predetermined density in order to determine whether or not the card (2) is valid.

6. A card reader/writer as claimed in claim 1, wherein the validity indicating means (66, 68) comprises a frequency to voltage converter (66) responsive to an output of the head means (34, 36), and a comparator (68) for comparing the output of the frequency to voltage converter (66) with a reference voltage. in order to determine whether the card (2) is valid.

7. In combination a card and a card reader/writer system to prevent card duplication fraud, the card having magnetic recording medium (4) of predetermined coercivity for storing data in the form of patterns of magnetic flux transitions which do not exceed a first predetermined spatial density, and further storing flux transitions of a second spatial density which is substantially greater than said first spacial density, the card reader/writer comprising head means (34, 36) for reading and writing magnetically encoded data from and onto the card, and capable of sensing flux transitions of a second spatial density recorded on the card, said head means comprising standard write heads having a maximum data recording rate which does not substantially exceed the first predetermined spacial density, the reader/writer further comprising means (e.g., 66, 68) responsive at least to the sensing of flux transitions of said second spacial density recorded on the card for providing an indication of the validity of data read from the card.

8. The apparatus of claim 7, wherein the second spatial density is not less than 80 flux transitions per mm.

9. The apparatus of claim 7, wherein the second spatial density is not less than 400 flux transitions per mm.

10. The apparatus of claim 7, wherein the predetermined coercivity is not greater than 300 oersteds.

11. The apparatus of claim 7, wherein the data and said magnetic flux transitions of said second spatial density are stored in respective different regions (10, 12, 22, 24, 26, 28) of the card.

12. The apparatus of claim 11, having a first plurality of regions (10) each containing identical data, and a second plurality of regions (12) each containing the magnetic flux transitions of said second spatial density.

13. The apparatus of claim 7, wherein the card has a first encodeable track (6) storing the magnetic flux transitions of said second spatial density and a second encodeable track (8) storing said data.

14. The apparatus of claim 7, the card having an encodeable track (6) storing both data and magnetic flux transitions of said second spatial density.

15. The apparatus of claim 14, the card having a second track (8) containing additional data.

16. The apparatus of claim 13, wherein the second track (8) does not contain said flux transitions of the second spatial density.

17. A method of fraud prevention in a system employing a magnetically encoded card having a magnetic recording medium of low coercivity, a card writer for recording high spatial density card validity data on the magnetic recording medium, and a plurality of card reader/writers for reading and writing low density data on the magnetic recording medium of the card, said plurality of card reader/writers lacking the ability to write validity data, comprising the following steps:
 (a) recording card validity data on the magnetically encoded card with the card writer;
 (b) recording alterable low density data on the card;
 (c) providing the plurality of card reader/writers to a general access group;
 (d) reading the card validity data with one of the plurality of card reader/writers in order to determine the validity of the card;

(e) reading the low density data on the card with the card reader/writer; and (f) utilizing the low density data only if the card has been determined to be valid in step (d), whereby fraud is prevented because the plurality of card reader/writers are incapable of writing validity data and therefore cannot duplicate valid cards.

18. The method of claim 17, wherein the magnetic recording medium contains two tracks having encodeable areas.

19. The method of claim 18, wherein validity data is recorded on the first of said tracks and low density data is recorded on the second of the tracks.

20. The method of claim 18, wherein validity data is recorded in a first block of the first track and low density data is recorded in a second block of the first track.

21. The method of claim 18, wherein low density data and validity data are recorded in the same block regions on a track.

22. The method of any one of claims 19, 20 or 21 wherein the density of the flux transitions comprising the validity data is varied according to a predetermined pattern.

23. The method of claim 17, wherein the validity data has a spatial density of not less than 80 flux transitions per millimeter.

24. The method of claim 17, wherein the validity data has a spatial density of not less than 400 flux transitions per millimeter.

* * * * *